C. FOSTER.
Corn-Planter
No. 40,681.
Patented Nov 24, 1863.
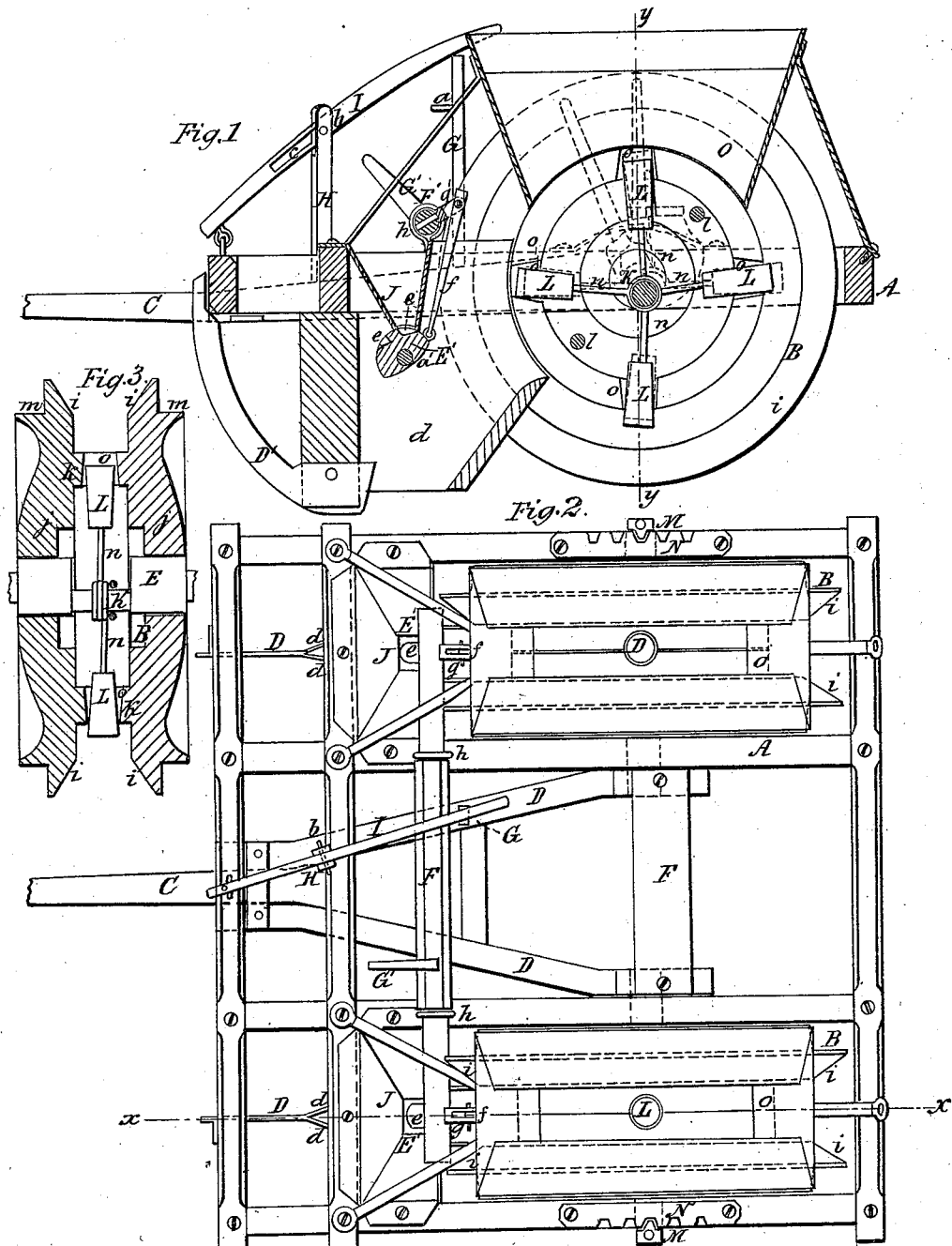

UNITED STATES PATENT OFFICE.

CLINTON FOSTER, OF PRAIRIE CITY, ILLINOIS.

IMPROVEMENT IN CORN-PLANTERS.

Specification forming part of Letters Patent No. 40,681, dated November 24, 1863.

*To all whom it may concern:*

Be it known that I, CLINTON FOSTER, of Prairie City, in the county of McDonough and State of Illinois, have invented a new and Improved Corn-Planter; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a plan or top view of the same; Fig. 3, a detached vertical section of one of the wheels of the same, taken in the line $y\,y$, Fig. 1.

Similar letters of reference indicate corresponding parts in the several figures.

To enable those skilled in the art to fully understand and construct my invention, I will proceed to describe it.

A represents a rectangular frame, which is mounted on two wheels, B B, and C is a draft-pole, which is attached to two hounds, D D, the latter extending back within the frame A and fitted loosely on the inner ends of the axles E of the wheels B B. On the back part of the hounds D D the driver's seat F is secured.

To one of the hounds D an upright, G, is attached, having a pin, $a$, projecting horizontally from it near its upper end, and there is also another upright, H, attached to the same hound, in the upper part of which a lever, I, is fitted, a pin, $b$, passing horizontally through the upper part of said upright and through an oblong slot, $c$, in the lever I, as shown clearly in Fig. 1. The front end of the lever I is connected to the front end of the frame A.

On the front part of the frame A there are secured two seed-boxes, J J, which have inclined sides. These seed-boxes are fitted each over two vertical parallel plates, $d\,d$, the space between which forms a seed-conveying tube. The front parts of the plates $d\,d$ are beveled and meet, forming an acute angle, and to the lower ends of the front beveled surfaces of the plates $d\,d$ there are attached the inner ends of curved cutters D′, the upper ends of said cutters being attached to the front part of the frame A, as shown in Fig. 1. The plates $d\,d$ form the furrow-openers, and the cutters D′ serve to cut or divide all trash—such as weeds, grass, &c.—which may be in their path.

Between each pair of plates $d\,d$ there is placed a segment, E′, the journals or axes $a'$ of which have their bearings in the plates $d\,d$. Each of these segments E′ has two holes, $e\,e'$, made in it, of V form, as shown clearly in Fig. 1, said holes being in the upper parts of the segments and having their inner ends in planes at opposite sides of their journals or axes $a'$. The back end of each segment E′ is connected by a rod, $f$, with an arm, $g$, on a shaft, F′, which is fitted in proper bearings, $h$, on the frame A, and has a hand-lever, G′, attached to it. By working the lever G′ backward and forward a rock motion is given the shaft F′, and a similar motion is transmitted therefrom to the segments E′ through the medium of the rods $f$. As the segments E′ are thus operated the corn is discharged alternately from the front and backs of the seed-boxes J J, the latter being directly over the segments which form the bottoms of the seed-boxes. On account of the V form of the holes $e\,e$, the corn is discharged readily from them and thrown with certainty into the spaces formed by the plates $d\,d$, the corn dropping into the furrows made by the front beveled edges of the plates $d$.

The corn is covered by the wheels B B, which have grooved peripheries and the sides of the grooves beveled, as shown at $i$. By this means the seed is not only covered with the earth, but the latter also firmly compacted around the former. The wheels B are formed each of two parts, $j\,j$, (see Fig. 3,) the inner surface of each part being provided with an annular concentric flange, $k$, which, when the two parts $j\,j$ are secured together by bolts or screws $l$, form the bottom of the groove in the peripheries of the wheels. The outer surfaces of the parts $j\,j$ are each provided with an annular concentric flange, $m$, which serve as gages to limit the penetration of the wheels into the earth and insure the covering of the corn at a uniform depth.

On the axle E of each wheel B there is a crank, K, having four rods, $n$, fitted loosely on it. These rods $n$ have each a piston, L, of cylindrical or slightly conical form, attached to them, and these pistons are fitted in holes $o$ in the flanges $k$ of the wheels.

The axles E are stationary, and are retained in position by an arm, M, at their outer ends, said arms being fitted in semicircular racks N, attached to the sides of the frame A.

The pistons L determine the depth of the holes in the flanges $k$, said holes being seed-cells and filled with seed as they pass under hoppers or seed-boxes O over the wheels. When the seed-cells are being filled the pistons L are drawn down to their fullest extent, and this movement is determined by the adjustment of the cranks K, and when the cells are filled, and shortly after they leave the hoppers or seed-boxes O, the pistons are forced outward and the corn or seed ejected into the spaces between the two pairs of plates h h. It will be seen that the movement or rotation of the wheels B, in connection with the cranks K on the axles E, causes the movement of the pistons in the holes or seed-cells o, and by adjusting the cranks K, which is done by turning the axles E through the medium of the arms M, the capacity of the holes or seed-cells o may be varied, as desired. This last-described dropping apparatus is more especially designed for planting in drills.

By having the driver's seat F attached to the hounds D and the lever I attached to one of said hounds and the frame A, as shown, the furrow shares or openers may be very readily elevated above the surface of the ground. The driver is not compelled to elevate himself in addition to the frame A, and the latter, in consequence of being free from the weight of the driver, will remain firm and steady when in either an elevated or working position.

Having thus described my invention, what I claim as new, and desire to secure by Letters Patent, is—

1. The pistons or plungers L, connected by rods n with the cranks K on the axles E of the wheels B, the latter being provided with flanges k, having holes o, in combination with the arms M, attached to the axles E, and the semicircular rack N, attached to the frame A, all arranged substantially as and for the purpose set forth.

2. The gages or flanges m on the wheels B B, in combination with the beveled surfaces i and the groove or space in their peripheries, as and for the purpose set forth.

CLINTON FOSTER.

Witnesses:
M. W. FOLSOM,
M. W. CAMPBELL.